No. 706,344. Patented Aug. 5, 1902.
E. D. SCHMITT.
TOOL FOR FORMING BOTTLE NECKS.
(Application filed Jan. 7, 1902.)
(No Model.)
2 Sheets—Sheet 2.
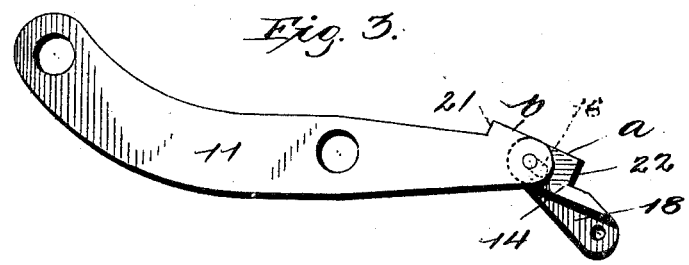
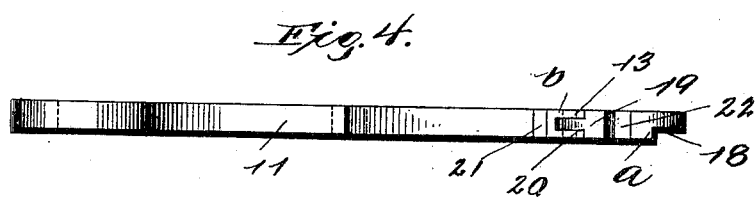
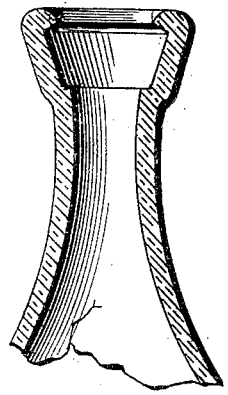

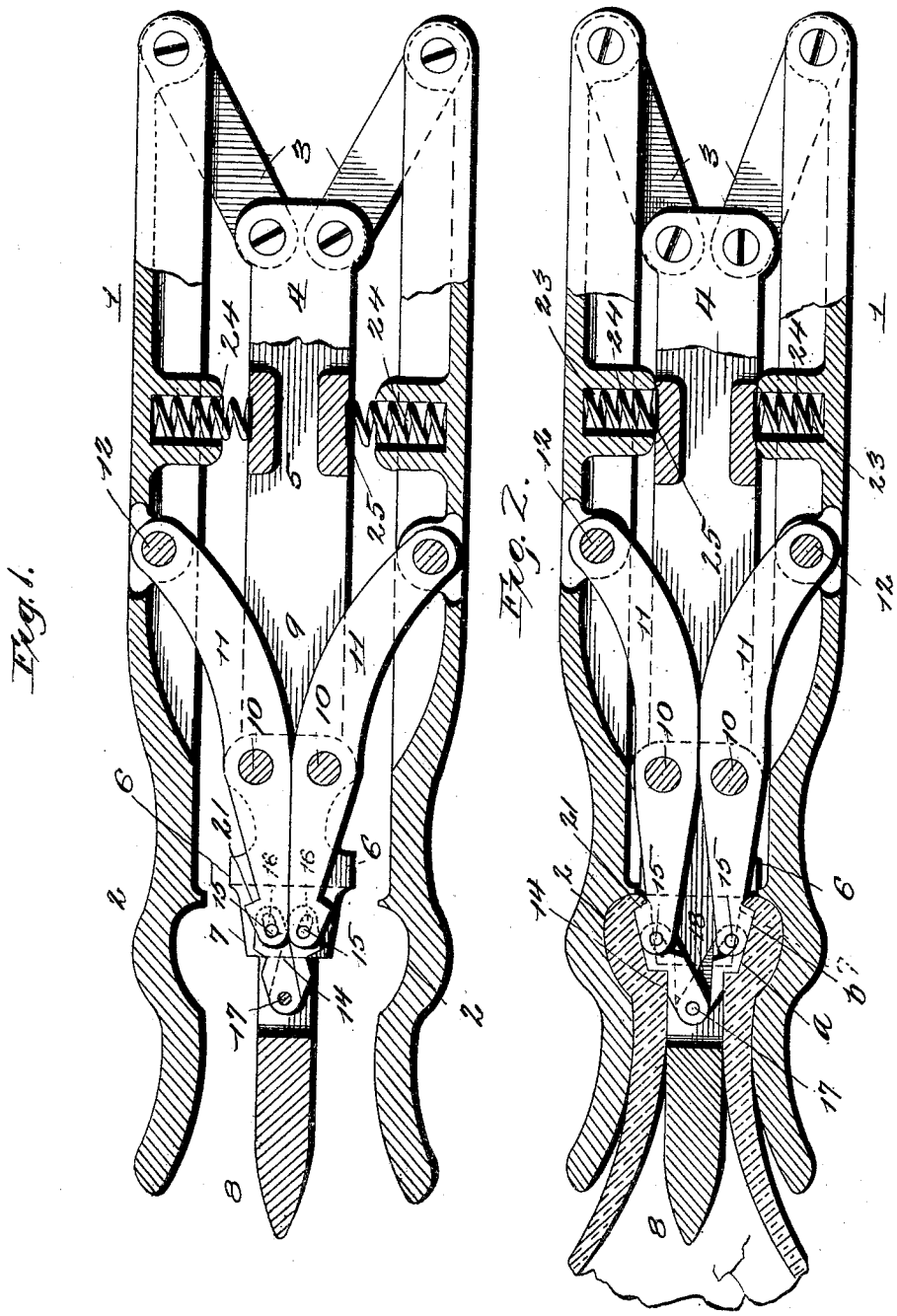

UNITED STATES PATENT OFFICE.

EDWARD D. SCHMITT, OF BALTIMORE, MARYLAND, ASSIGNOR, BY MESNE ASSIGNMENTS, TO UNIVERSAL SEAL AND STOPPER COMPANY, OF BALTIMORE, MARYLAND, AND CAMDEN, NEW JERSEY, A CORPORATION OF NEW JERSEY.

TOOL FOR FORMING BOTTLE-NECKS.

SPECIFICATION forming part of Letters Patent No. 706,344, dated August 5, 1902.

Application filed January 7, 1902. Serial No. 88,723. (No model.)

*To all whom it may concern:*

Be it known that I, EDWARD D. SCHMITT, a citizen of the United States, residing in the city of Baltimore and State of Maryland, have invented certain new and useful Improvements in Tools for Forming Bottle-Necks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to tools for forming the necks of bottles, jars, &c., and more especially to a tool for forming in the throat of a bottle or jar a chamber in which the seal expands, said chamber having an upper locking-shoulder and a lower square or approximately square sealing-seat. I have found in practice that the insertion of the core of a tool of this character into a bottle-neck causes a movement of the plastic glass in the direction of the movement of the tool and that the pressure upon the outside of the bottle-neck produced by the forming-jaws causes a further movement of the glass in the direction just mentioned, so that when the boss, the lower edge of which assists in forming the sealing-seat, reaches its final position in the bottle-neck the closing of the jaws on the outside causes the glass to run away from the seat-forming edge of the boss, thus producing a shoulder with more than the desired inclination.

I am aware that tools involving the same general idea embodied in the present tool have been invented; but none of these, so far as I know, embody a construction capable of operating upon the glass to produce a chamber of the desired internal contour formed by the tool about to be described.

In forming a chamber like or substantially like the one desired in the present instance I have found it to be highly important that the tool embody such a construction as to operate upon the glass in such a manner as it is inserted into the plastic glass that the lower sealing-seat will be ultimately formed somewhat below the boss in which the forming devices operate. This necessitates a construction and an arrangement of the forming devices so that they will be capable of being extended beyond the boss both laterally and longitudinally—that is to say, in the present invention the lower edge of the boss is made to form a sort of preliminary shoulder when placed in the plastic glass, which shoulder presents the glass in such shape as to be properly operated upon by the longitudinally-extended part of the forming device, thus providing a well-defined shoulder somewhat beyond the boss, as before mentioned. I have found, too, that it is advantageous to so connect the jaws and core and jaws and expanding-levers that in the movement of said jaws they are always maintained parallel with the core, and thus brought squarely down upon the material in forming the bottle-neck.

The object of this invention, therefore, is to provide a suitable tool for forming a chamber of the character above mentioned in the neck of a bottle and one in which the objectionable features above mentioned are eliminated.

In the drawings illustrating the invention, Figure 1 is a central longitudinal section of a tool constructed in accordance with my invention, the same being shown in open position. Fig. 2 is a similar view of the tool in closed position illustrating a bottle in position between the forming-jaws, with the parts of the tool in the position they assume in forming the chamber. Fig. 3 is a side elevation of one of the expanding-levers, with its connected link constituting the forming device. Fig. 4 is a top plan view of the same; and Fig. 5 is a sectional view of a bottle-neck, showing the formation of the chamber therein resulting from the use of the tool.

Referring to the drawings, the numeral 1 indicates two oppositely-disposed jaws shaped on their inner engaging faces, as indicated by the numeral 2, to produce a corresponding formation of the bottle-neck on the outside thereof. The rear ends of these jaws are pivotally connected by links 3 to the rear end 4 of a central core 5. I preferably form integral with the core 5, near its forward end, a stop or shoulder 6, formed with a conical forward extension 7, for a purpose hereinafter specified, and said core is further formed with a slightly-tapered end 8 to guide said core into proper position in the bottle-neck, as is usual in tools of this character.

The numeral 9 indicates a slot formed in the core in which I pivot at 10 the expanding-levers 11 11, which have their rear ends pivoted at 12 12 to the jaws, and their forward ends are bifurcated or forked, as indicated by the numeral 13 13, for the reception of the rear ends of the links 14 14, which are pivoted to the forward ends of said levers by pivots 15 15, passing through slightly-elongated slots 16 16 in said links. The forward ends of the links 14 14 are pivoted near the forward end of the slot 9 in the core and held therein by a common pivot 17. These links 14 14 are cut away adjacent to their forward ends, as shown at 18, Fig. 3, so that when they are put together in the slot the entire thickness of the two pieces will be equal to the thickness of the link at the point 19, and these links are further cut away, as indicated by the numeral 20, so that their forward ends will set between the bifurcated ends 13 of the expanding-levers 11, as clearly shown in Fig. 4 of the drawings. Each of the expanding-levers is provided with an inclined shoulder 21, which in the operation of the tool forms the inclined shoulder in the bottle-neck, and each of the links 14 is provided with a shoulder 22, which forms the sealing-seat in the operation of the device.

Preferably formed integral with the jaws are cups 23, into which are set springs 24, having their inner ends seated in depressions 25 in the core, said springs being for the purpose of keeping the jaws normally separated and the ends of the levers and forming ends of the links normally retracted in the forward extension 7.

In the operation of the tool, after the forward end of the core is inserted into the bottle-neck the jaws are pressed together, bringing their shaping-surfaces in contact with the glass to shape the bottle near its mouth. By this movement of the jaws the levers 11 will be rocked on their pivots, thus projecting their forward ends beyond the periphery of the extension 7, bringing the shoulders 21 into contact with the glass to form the upper locking-shoulder of the bottle-neck. The links 14 during this movement will have also been projected beyond the periphery of the extension 7, thus bringing the part $a$ in line with the part $b$ of the levers and the shoulders 22 of the links beyond the forward edge of said extension 7. When the forming ends of the levers and links are retracted within the extension, the pivots 15 will occupy the forward ends of the slots 16 in the links; but obviously when the jaws are closed and the forming ends of the levers and links are projected the opposite ends of said slots are occupied by said pivots. It will be seen that when the tool is first inserted into the bottle-neck and the glass made to abut against the stop 6 the extension 7 will form a shoulder in the plastic glass; but this is not the shoulder that is ultimately formed, for as the forming-shoulders 22 of the links are projected beyond the edge of the extension they will engage the material adjacent to the forward end of the extension and crowd the same downward or toward the end of the tool, and thus form the desired shoulder, it being of course understood that either the tool or the bottle is rotated or partially rotated to bring about this result. The stop 6 in the operation performs the additional function of limiting the inward movement of the jaws, as is evident.

In the drawings I have shown the jaws held normally apart by spiral springs; but it is evident that other forms of springs well known in this art could be substituted for those shown, as the operation of the forming device depends in no way upon the springs—that is to say, upon any particular form of springs for holding the jaws normally open—nor upon the hinging of the jaws to the core in the manner shown, for I may, if found desirable, modify the tool to adapt it for use with a spring such as that shown and described in my application Serial No. 76,873, filed September 28, 1901, wherein the spring is shown secured to the core and to the jaws.

It will be seen that by pivoting the rear ends of the jaws to the rear end of the core by the links 3 and the positive pivoting of the levers to the jaws and to the core a longitudinal movement of the core relative to the jaws is accomplished and the said jaws maintained parallel with said core and with each other.

Having thus described my invention, what I claim is—

1. In a tool for forming bottle-necks, the combination with movable jaws and a central core, of levers connected to the core and jaws, links pivoted in advance of the lever ends and also to said lever ends, thus in conjunction with said ends forming a compound forming device adapted to be projected into operative position and retracted therefrom by the movement of the jaws, substantially as and for the purpose set forth.

2. In a tool for forming bottle-necks, the combination with a central core, of jaws connected to said core, levers rockably secured to the core and having connection with the jaws, said levers having ends constituting a part of the forming means, links pivoted to the core and to the ends of said levers and constituting the other part of the forming means, substantially as set forth.

3. In a tool for forming bottle-necks, the combination with a central core, of jaws connected to said core by links, levers pivoted to the core and to the jaws, whereby the jaws in their opening and closing movements are maintained parallel to the core and to each other, said levers having ends constituting a part of the forming device, links pivoted to the core and to the ends of said levers, and constituting the other part of the forming device, substantially as set forth.

4. In a tool for forming bottle-necks, the combination with a central core having a slot therein, of jaws connected with said core by links, levers pivoted in said slot and to the jaws, the ends of said levers constituting a part of the forming means, links pivoted in said slot in advance of the ends of said levers and pivoted to the ends thereof and constituting the other part of the forming means, substantially as set forth.

5. In a bottle-neck-forming tool, the combination with a central core having a slot therein near its forward end, jaws connected with said core and means for holding them normally separated, a stop on the core and having a forward extension, levers pivoted in the slot and to the jaws, the ends of said levers constituting a part of the forming means, links pivoted in the slot in advance of the lever ends and pivoted thereto and constituting the other part of the forming means, substantially as described.

6. In a tool for forming bottle-necks, the combination with a slotted central core, of jaws connected with said core, means for normally separating said jaws, a stop on said core having a forward extension adapted to enter the bottle-neck, levers pivoted to the core and to the jaws and having their ends shaped to constitute part of the forming device and working in said extension, links pivoted in the slot and having elongated slots in their rear ends, pins passing through the ends of the levers and the slots in the links, whereby when the jaws are closed the forming means on said links will be projected beyond the forward extension both laterally and longitudinally, substantially as described.

7. In a tool for forming bottle-necks, the combination with a central core having an enlargement near its forward end of jaws movable to and from said core for the purpose set forth, levers connected with the jaws and core, a forming device constituted in part by the lever ends, links having connection with the core and with the lever ends and constituting a part of the forming device, forming device on the links being adapted to be projected beyond the enlargement both laterally and longitudinally when the jaws are moved toward each other, substantially as described.

8. In a tool for forming bottle-necks, the combination with a central core having an enlargement near its forward end and a stop or shoulder 6, of jaws connected with said core, a forming device mounted in said core formed in part by levers pivoted to the core and having connections with the jaws, and links pivoted in the core and having connection with the lever ends, said forming device being adapted to rest normally in the enlargement of the core but to be projected beyond said enlargement both laterally and longitudinally, substantially as and for the purpose set forth.

9. In a tool for forming bottle-necks, the combination with a central core having links 3 pivoted to its rear end, jaws pivotally connected to said links and provided with forming-surfaces at their forward ends, an enlargement near the forward end of said core, a forming device mounted in said core and formed in part by levers pivoted to the core and having connection with the jaws, and links pivoted in the core in advance of the enlargement and having connection with the lever ends, said forming device being adapted to rest normally in the enlargement of the core but to be projected beyond said enlargement both laterally and longitudinally when the jaws are moved toward each other, substantially as and for the purpose set forth.

10. In a tool for forming bottle-necks, the combination with movable jaws and a central core, of levers connected with the core and operable by the jaws, members mounted in advance of the lever ends and also having connection with said lever ends, thus forming a compound forming device, the parts thereof being adapted to be projected into operative position both laterally and longitudinally with respect to the core, and retracted therefrom by the movement of the jaws, substantially as described.

In testimony whereof I affix my signature in presence of two witnesses.

EDWARD D. SCHMITT.

Witnesses:
JOHN W. HEWES,
MABEL E. STEARNS.